United States Patent
Nguyen et al.

(10) Patent No.: US 11,140,011 B2
(45) Date of Patent: Oct. 5, 2021

(54) PAPR REDUCTION FOR OFDM SIGNALS

(71) Applicants: Quang Nguyen, Saskatoon (CA); Ha H. Nguyen, Saskatoon (CA); Brian Berscheid, Saskatoon (CA); Eric Salt, Saskatoon (CA)

(72) Inventors: Quang Nguyen, Saskatoon (CA); Ha H. Nguyen, Saskatoon (CA); Brian Berscheid, Saskatoon (CA); Eric Salt, Saskatoon (CA)

(73) Assignee: Vecima Networks Inc., Victoria (CA)

( * ) Notice: Subject to any disclaimer, the term of this patent is extended or adjusted under 35 U.S.C. 154(b) by 50 days.

(21) Appl. No.: 16/794,121

(22) Filed: Feb. 18, 2020

(65) Prior Publication Data

US 2020/0267040 A1  Aug. 20, 2020

Related U.S. Application Data

(60) Provisional application No. 62/806,866, filed on Feb. 17, 2019.

(51) Int. Cl.
*H04L 27/26* (2006.01)
*H04L 5/00* (2006.01)

(52) U.S. Cl.
CPC ...... *H04L 27/2618* (2013.01); *H04L 27/2602* (2013.01); *H04L 27/2621* (2013.01); *H04L 27/2624* (2013.01); *H04L 5/0007* (2013.01)

(58) Field of Classification Search
CPC ............ H04L 27/2618; H04L 27/2602; H04L 27/2621; H04L 27/2624; H04L 5/0007

USPC ........................................................ 375/260
See application file for complete search history.

(56) References Cited

U.S. PATENT DOCUMENTS

| | | | | |
|---|---|---|---|---|
| 7,627,046 | B1 * | 12/2009 | Dick ................... | H04L 27/2621 370/206 |
| 2009/0310704 | A1 * | 12/2009 | Jethanandani ...... | H04L 27/2618 375/296 |
| 2013/0177089 | A1 * | 7/2013 | Al-Safadi ........... | H04L 27/2624 375/260 |

* cited by examiner

*Primary Examiner* — Kevin M Burd
(74) *Attorney, Agent, or Firm* — Voyer Law

(57) ABSTRACT

In embodiments of the presently described subject matter, two efficient PAPR reduction methods for OFDM signals based upon the principle of tone reservation and building upon the clipping noise analysis presented in "Analysis of clipping noise and tone reservation algorithms for peak reduction in OFDM systems," L. Wang and C. Tellambura, *IEEE Trans. Veh. Technol.*, vol. 57, pp. 1675-1694, May 2008 are provided, each comprising two stages. The first stage is performed offline to prepare a set of cancellation signals based on the settings of the OFDM system. In particular, these cancellation signals are constructed to cancel signals at different levels of maximum instantaneous power that are above a predefined threshold. The second stage is performed online and in an iterative manner to reduce the peaks of OFDM symbols by using the cancellation signals constructed in the first stage.

8 Claims, 9 Drawing Sheets

PAPR REDUCTION FOR OFDM SIGNALS

TECHNICAL FIELD

The presently described subject matter relates to methods and systems for peak reduction of Orthogonal Frequency Division Multiplexing (OFDM) signals.

BACKGROUND

The following references are related to this field and may provide information relevant to the subject matter herein, and the disclosures of each of the following documents are incorporated herein by reference:

[1] Y. Rahmatallah and S. Mohan, "Peak-to-average power ratio reduction in OFDM systems: A survey and taxonomy," *IEEE Commun. Surv. Tutor, vol.* 15, no. 4, pp. 1567-1592, 2013.

[2] R. Yoshizawa and H. Ochiai, "Effect of clipping and filtering with distortionless PAPR reduction for OFDM systems," in *Proc. IEEE 82nd VTC Fall*, pp. 1-5, IEEE, September 2015.

[3] J. Tellado and J. M. Cioffi, "Peak power reduction for multicarrier transmission," in *Proc. IEEE Global Telecommun. Conf.*, vol. 99, pp. 5-9, 1998.

[4] J. Tellado, *Multicarrier modulation with low PAR: applications to DSL and wireless*, vol. 587. Springer Science & Business Media, 2006.

[5] J.-C. Chen, M.-H. Chiu, Y.-S. Yang, and C.-P. Li, "A suboptimal tone reservation algorithm based on cross-entropy method for PAPR reduction in OFDM systems," *IEEE Transactions on Broadcasting*, vol. 57, no. 3, pp. 752-756, 2011.

[6] L. Jian and Y. Wan, "An improved tone reservation method for PAPR reduction in OFDM systems," in *International Conference on Mechatronic Sciences*, pp. 3791-3794, Electric Engineering and Computer IEEE, 2013.

[7] X. Lv and Y. Wan, "Efficient tone reservation peak-to-average power ratio reduction system with optimal clipping for orthogonal frequency division multiplexing systems," *IET Communications*, vol. 9, no. 17, pp. 2070-2076, 2015.

[8] D. Guel and J. Palicot, "FFT/IFFT pair based digital filtering for the transformation of adding signal PAPR reduction techniques in tone reservation techniques," in *Fifth International Conference on Wireless and Mobile Communications (ICWMC '09)*, pp. 200-204, August 2009.

[9] Y.-C. Wang and Z.-Q. Luo, "Optimized iterative clipping and filtering for PAPR reduction of OFDM signals," *IEEE Trans. Commun.*, vol. 59, no. 1, pp. 33-37, 2011.

[10] D. Guel and J. Palicot, "Transformation of any adding signal technique in tone reservation technique for PAPR mitigation thanks to frequency domain filtering," *International Journal on Advances in Telecommunications*, 2011.

[11] Y. Wang, W. Chen, and C. Tellambura, "Genetic algorithm based nearly optimal peak reduction tone set selection for adaptive amplitude clipping PAPR reduction," *IEEE Transactions on Broadcasting, vol.* 58, no. 3, pp. 462-471, 2012.

[12] J. Bai, Y. Li, W. Cheng, H. Du, and Y. Wang, "A novel peak-to-average power ratio reduction scheme via tone reservation in OFDM systems," *China Communications*, vol. 14, no. 11, pp. 279-290, 2017.

[13] E. Tampubolon and H. Boche, "Probabilistic analysis of tone reservation method for the PAPR reduction of OFDM systems," in *IEEE International Conference on Acoustics, Speech and Signal Processing (ICASSP)*, pp. 3799-3803, IEEE, 2017.

[14] L. Wang and C. Tellambura, "Analysis of clipping noise and tone reservation algorithms for peak reduction in OFDM systems," *IEEE Trans. Veh. Technol.*, vol. 57, pp. 1675-1694, May 2008.

[15] C. Tellambura, "Computation of the continuous-time PAR of an OFDM signal with BPSK subcarriers," *IEEE Commun. Letters*, vol. 5, no. 5, pp. 185-187, 2001.

[16] S. Boyd and L. Vandenberghe, *Convex optimization*. Cambridge University Press, 2004.

I. Introduction

Orthogonal frequency division multiplexing (OFDM) modulation has been widely adopted in digital communications. However, a major drawback of OFDM signals is high peak-to-average power ratio (PAPR) [1]. High-PAPR signals require a linear high-power amplifier (HPA), which is usually very inefficient. Moreover, given the limited linear range of an HPA, the high-PAPR signals are typically amplified near the saturation region of the amplifier, causing large in-band and out-of-band distortions.

Over the years, various techniques have been developed to reduce the peak of an OFDM signal, such as clipping and filtering, tone reservation (TR), multiple signaling and coding [1]. The coding approaches embed the data sequence in a longer sequence and only a subset of all possible sequences is used to exclude patterns with high PAPR. The multiple signaling schemes reduce the peak of a signal by controlling the phase of the data sequence through a phase optimization process.

Clipping and filtering is probably the simplest method, but it distorts the desired in-band signal, resulting in bit-error-rate (BER) degradation and also increases adjacent out-of-band distortion [2]. These distortions might not be accepted in many practical OFDM systems where the amount of in-band distortion is highly restricted due to the use of very high order quadrature amplitude modulation (QAM).

The TR approach was first proposed in [3], which reserves a number of subcarriers to generate a peak canceling signal that can reduce the peak power of the transmitted signals. The subcarriers or tones are selected to be mutually exclusive with the tones used for data transmission, which allows the receiver to extract the data symbols without distortions. Although an effective peak canceling signal can be found, the computational complexity of this method is high [4]. A gradient-based method has been shown to achieve a good result [4], but with lower complexity. This method tries to reduce the peaks of OFDM signals within a predefined threshold in an iterative manner. However, its convergence rate is slow and the number of multiplications and additions performed per iteration can be high. Thus, many schemes have been proposed to achieve faster convergence and/or lower computational complexity. The authors in [5] apply a cross-entropy method to search for a suboptimal reserved tone set to achieve a higher peak reduction per iteration. In [6], [7], the authors propose different techniques to jointly optimize the clipping threshold along with the peak-canceling signals.

Moreover, TR can also be combined with the technique of clipping and filtering to provide a different method for PAPR reduction, which shall be called clipping-and-filtering TR (CFTR) [8]. This method takes advantage of the computational efficiencies of the fast Fourier transform/inverse fast Fourier transform (FFT/IFFT) algorithms and processes signals in the frequency domain instead of the time domain. A drawback of the CFTR method is that a large number of iterations is usually required to obtain the desired amount of peak reduction. The authors in [9] apply convex optimization to find the optimal filters to reduce the number of iterations. A faster convergence speed can also be achieved by applying a suitable scaling factor to the filtered signal, which was investigated in [10]-[12].

In general, all the PAPR reduction methods discussed above entail significant complexity and overhead when reducing signal peaks online. In particular, the complexity of finding the optimal solution for a general case with the TR algorithm could become prohibitive for a large number of subcarriers [13]. Furthermore, in certain applications, the number of subcarriers along with their tone locations might change over time, which makes it harder to find a suitable peak reduced signal in a small number of iterations.

II. OFDM Signals

In an OFDM system, N data symbols $X_0, \ldots, X_{N-1}$ are modulated on a set of N orthogonal subcarriers. The analog baseband-equivalent form of an OFDM symbol is:

$$x(t) = \frac{1}{\sqrt{N}} \sum_{k=0}^{N-1} X_k e^{j2\pi \frac{k}{T} t} \quad (1)$$

where T is the symbol duration and $\Delta f = 1/T$ is the frequency spacing between adjacent subcarriers.

A discrete-time OFDM signal $x=[x[0], \ldots, x[NJ-1]]$ is obtained by sampling $x(t)$ with the sampling frequency $F_s = NJ/T$, where J denotes the oversampling factor. That is:

$$x[n] = x(t)\big|_{t=\frac{nT}{JN}} = \frac{1}{\sqrt{N}} \sum_{k=0}^{N-1} X_k e^{j2\pi \frac{nk}{NJ}}, \; 0 \le n \le NJ-1 \quad (2)$$

The oversampled discrete-time signal in (2) can be produced by padding $(J-1)N$ zero values in the middle of the frequency symbol and performing a JN-length IFFT operation on the padded frequency symbol. The padded frequency symbol is:

$$X = \left[ X_0, \ldots, X_{\frac{N}{2}-1}, \underbrace{0, \ldots, 0}_{(J-1)N \text{ zeros}}, X_{\frac{N}{2}}, \ldots, X_{N-1} \right] \quad (3)$$

The PAPR of the analog OFDM signal $x(t)$ is defined in a symbol-wise manner as $$PAPR_C(x) = \frac{\max_{0 \le t \le T} |x(t)|^2}{E\{|x(t)|^2\}} \quad (4)$$

A measurement of PAPR using discrete time samples is:

$$PAPR_D(x) = \frac{\max_{0 \le n \le NJ-1} |x[n]|^2}{E\{|x[n]|^2\}} \quad (5)$$

In order to have (5) approximate well (4) of the analog signal, it is required that $J \ge 4$ [15].

In the literature, it is customary to use the complimentary cumulative distribution function (CCDF) of the PAPR as a performance criterion, which is defined as:

$$CCDF(\psi) = Pr\{PAPR_D(x) \ge \psi\} \quad (6)$$

If N is large enough ($N \ge 64$ is practically sufficient), then based on the central limit theorem, the real and imaginary parts of $x[n]$ have Gaussian distributions, hence the envelope of $x[n]$ follows a Rayleigh distribution [1]. Also, in theory, the maximum possible PAPR, which occurs when all subcarriers align in phase, is proportional to the number of active subcarriers.

III. Overview of TR Techniques

In TR techniques, both the transmitter and the receiver must agree to reserve a set of G subcarriers for peak reduction, while the remaining $(N-G)$ subcarriers are used for data transmission. Peak canceling signal $c=[c[0], \ldots, c[NJ-1]]$ is constructed from the reserved tones. The peak-reduced signal $y=[y[0], \ldots, y[NJ-1]]$ is given by:

$$y[n] = x[n] + c[n] = \frac{1}{\sqrt{N}} \sum_{k=0}^{N-1} (X_k + C_k) e^{j2\pi \frac{nk}{NJ}} \quad (7)$$

where $0 \le n \le NJ-1$ and $$C = \left[ C_0, \ldots, C_{\frac{N}{2}-1}, 0, \ldots, 0, C_{\frac{N}{2}}, \ldots, C_{N-1} \right]^T$$

is the frequency symbol used to construct c.

The set of subcarriers used is referred to as a peak reservation tone set (PRT), denoted as $\mathcal{R} = \{i_0, i_1, \ldots, i_{G-1}\}$. The frequency vector C is restricted to have non-zero elements only at the reserved tones. That is:

$$X_k + C_k = \begin{cases} X_k, & k \in \mathcal{D} \\ C_k, & k \in \mathcal{R} \end{cases} \quad (8)$$

where $\mathcal{D}$ is the set of data tones, and $\mathcal{D} \cap \mathcal{R} = \emptyset$.

The PAPR of the peak-reduced OFDM signal is then computed as [4]

$$PAPR(y) = \frac{\max_{0 \le n \le NJ-1} |x[n] + c[n]|^2}{E\{|x[n]|^2\}} \quad (9)$$

Since the denominator of (9) does not depend on C, the optimal peak canceling signal is chosen to minimize the peak power of $y[n]$:

$$C = \arg \min_{C \in \mathbb{C}^N} \left\{ \max_{0 \le n \le NJ-1} |x[n] + c[n]|^2 \right\} \quad (10)$$

subject to: $\mathcal{H}(C) \le G$ where $\mathbb{C}^N$ is the N-dimensional complex number space and $\mathcal{H}$ (v) denotes the Hamming weight of vector v, which is the number of non-zero elements in v.

The problem in (10) can be expressed in the form of quadratic programming [16]. The optimum solution can be found but it requires high computational cost, which is not suitable for online processing. Instead of solving for the optimal canceling signal, one could find a canceling signal to bring the peak of y[n] to be very close to some predefined threshold, $\mathcal{T}$. This is explained further below.

Given a threshold $\mathcal{T}$, introduce a clipping function [3]:

$$g_\mathcal{T}(\xi) = \begin{cases} \xi, & \text{if } |\xi| \leq \mathcal{T} \\ \mathcal{T}e^{j\angle\xi} & \text{if } |\xi| > \mathcal{T} \end{cases} \quad (11)$$

where $\xi$ is a complex variable. By applying the clipping function to y[n], the problem in (10) is transformed into the following problem:

$$C = \arg\min_{C \in \mathbb{C}^G} \left\{ \sum_{n=0}^{NJ-1} |x[n] + c[n] - g_\mathcal{T}(x[n] + c[n])|^2 \right\} \quad (12)$$

subject to: $\mathcal{H}(C) \leq G$

Let f=[f[0], ..., f[NJ−1]] be the residual signal after applying the clipping operation on y[n]. That is, $$f[n]=y[n]-g_\mathcal{T}(y[n]) \quad (13)$$

The optimization problem in (12) tries to find c to minimize the power of f. For this reason, f is also called the clipping noise associated with the signal y, and the optimum c helps to create a signal with minimal level of this noise.

A. Conventional Gradient-Based TR (GTR)

The gradient algorithm in [3] solves the problem in (12) in an iterative manner as follows. At the kth step of the algorithm:

$$c_{k+1}=c_k-\gamma\sum_{i\in\mathcal{M}_k}\alpha_{k,i}\upsilon_i(k) \quad (14)$$

where $\gamma$ is a constant; $\mathcal{M}_k$ is the set of indices of those samples in $(x+c_k)$ having their magnitudes larger than $\mathcal{T}$; k=[k[0], ..., k[NJ−1]] is called a kernel, which is obtained by setting the magnitudes of the reserved tones to 1 and then performing an Inverse Discrete Fourier Transform (IDFT). That is:

$$k[n] = \frac{1}{|\mathcal{R}|}\sum_{\ell=0}^{NJ-1} p[\ell]e^{j2\pi\frac{n\ell}{NJ}}, 0 \leq n \leq NJ-1, \quad (15)$$

where $$p[\ell] = \begin{cases} 1, & \text{if } \ell \in R \\ 0, & \text{otherwise} \end{cases}$$

The operation $\upsilon_i(v)$ represents a circular shift of a time vector v by i samples to the right, whereas $\alpha_{k,i}$ is a complex value given by:

$$\alpha_{k,i}=(|x[i]+c_k[i]|-\mathcal{T})y^{j\angle(x[i]+c_k[i])} \quad (16)$$

The resulting signal after performing k iterations is:

$$y_k=x+c_k \quad (17)$$

The process stops when either a maximum number of iterations is reached or no peak above $\mathcal{T}$ in $y_k$ is found, i.e., $\max|y_k|<\mathcal{T}$.

The GTR algorithm works with time domain samples, and utilizes a large number of multiplications and additions per iteration. The calculation of $\alpha_{k,i}$ needs $2|\mathcal{M}_k|$ real multiplications. The scaling with $\alpha_{k,i}$ and $\gamma$ in (14) requires additional $4|\mathcal{M}_k|JN+JN$ real multiplications. So in total, the number of multiplications per iteration of the GTR algorithm is $4|\mathcal{M}_k|JN+2|\mathcal{M}_k|+4JN$ The number of additions required by the GTR algorithm is $2|\mathcal{M}_k|JN+2$ for each iteration, which is in the same order as the number of multiplications.

Moreover, it should be pointed out that $\gamma$ is defined as a constant in [3], [4] and how to properly choose its value is not thoroughly studied in literature. A large value of $\gamma$ could cause the algorithm to fail to converge as the set $\mathcal{M}_k$ grows larger after each iteration, whereas a small value of $\gamma$ makes the algorithm converge slowly.

B. Conventional Clipping and Filtering TR (CFTR)

The high complexity of the GTR algorithm could be reduced by applying clipping and filtering the clipping noise defined in (13). The clipping operation, however, causes distortions to the data tones. Thus, filtering is implemented so that only the frequency portion of the clipping noise that corresponds to locations of the reserved tones is retained. That is, the filter is defined as:

$$H(e^{j\omega}) = \begin{cases} 1, & \text{if } \omega \in \mathcal{R} \\ 0, & \text{otherwise} \end{cases} \quad (18)$$

In other words, the filtering operation in (18) is simply a projection on the reserved tone set. Hence, a signal obtained after filtering the clipping noise is:

$$c=\mathcal{F}^{-1}\{H(\mathcal{F}\{f\})\} \quad (19)$$

where $\mathcal{F}$ denotes the discrete Fourier transform (DFT) and $\mathcal{F}^{-1}$ is the inverse DFT (IDFT). The canceling vector c is then scaled by a factor $\beta$ to further suppress the peak of the resulting signal [10], [11]. That is, $$\hat{y}=y+\beta c \quad (20)$$

The factor $\beta$ is chosen to minimize the mean squared error between the canceling signal and clipping noise:

$$\beta = \arg\min_\beta \sum_{n\in S} |f[n]-\beta c[n]|^2 \quad (21)$$

where $S$ represents the set of the peak samples. There are two methods of selecting this set, which are proposed in [10] and [11]. In the present disclosure, the set is defined as in [10], which is $S=\{n:|x[n]|>\mathcal{T}\}$. This set resembles the set $\mathcal{M}_k$ used in the GTR algorithm discussed previously. A solution to the problem in (21) is given by $$\beta = \frac{\mathcal{R}\left[\sum_{n\in S}f[n]c^*[n]\right]}{\sum_{n\in S}|c[n]|^2} \quad (22)$$

where c*[n] is a complex conjugate of c[n]. It is pointed out that, due to the effect of the filter $H(e^{j\omega})$, the peak regrows significantly. As a consequence, multiple iterations of the clipping and filtering are required to obtain satisfactory PAPR reduction. The algorithm is illustrated in FIG. 1.

The complexity of the CFTR algorithm depends mainly on the JN-point DFT/IDFT pair and weighting the canceling signal in (20). The former can be efficiently implemented by FFT/IFFT, which has a complexity of (JN log(JN)). The latter needs $4|\mathcal{S}|$ real multiplications, one real division for the calculation of β in (22) and 2JN real multiplications to scale the time vector c. In total, per iteration, the CFTR algorithm requires 1 real division and ($\mathcal{M}_{DFT}+\mathcal{M}_{IDFT}+4|\mathcal{S}|+2JN$) multiplications, where $\mathcal{M}_{DFT}$ and $\mathcal{M}_{IDFT}$ represent the number of multiplications performed by the DFT and IDFT blocks, respectively.

The CFTR algorithm reduces the number of iterations (as shown in the Simulation Results below) and the complexity of the GTR algorithm. However, its complexity is still too high and can be further reduced.

SUMMARY

In embodiments of the presently described subject matter, two efficient PAPR reduction methods for OFDM signals based upon the principle of tone reservation and building upon the clipping noise analysis presented in [14] are provided, each comprising two stages. The first stage is performed offline to prepare a set of cancellation signals based on the settings of the OFDM system. In particular, these cancellation signals are constructed to cancel signals at different levels of maximum instantaneous power that are above a predefined threshold. The second stage is performed online and in an iterative manner to reduce the peaks of OFDM symbols by using the cancellation signals constructed in the first stage.

The first novel PAPR reduction method operates in the time domain and yields greater peak cancellation at a lower computational complexity than a conventional time domain GTR method described above. The second PAPR reduction method operates in the frequency domain and offers a reduced computational complexity as compared to a conventional CFTR method described above. Both novel PAPR reduction methods algorithms efficiently reuse pre-calculated canceling signals to reduce the computational complexity of the conventional peak reduction algorithms based on the TR principle. The pre-calculated canceling signals can be updated when different tone sets are selected for data transmission, accommodating many practical applications. Simulation results show that the proposed methods and systems can obtain very good peak reduction with a smaller number of iterations, and with fewer numbers of multiplications and additions per iteration when compared to the conventional TR and CFTR algorithms and methods.

In accordance with one aspect of the presently described subject matter, there is provided a method of reducing the signal level peaks of a digital OFDM communication signal comprising: reserving a set of subcarriers to be used for data transmission; reserving a set of subcarriers to be used for peak cancellation; constructing a database of cancellation signals based on a user-defined target peak threshold and the set of reserved tones; analyzing the incoming OFDM communication signal to determine the sample index locations and magnitudes of its signal level peaks in the time domain; constructing a cancellation signal which is added to the incoming OFDM communication signal to reduce its signal level peaks; wherein the analysis process involves: identifying a set of samples within the OFDM communication signal having their signal level magnitude exceed the user-defined target peak threshold; locating those samples in the identified set which correspond to signal level local maxima of the OFDM communication signal; determining the magnitudes and phase angles of the local maxima found; wherein the construction of the cancellation signal involves: for each local maxima found in the analysis process, retrieving a signal from the database corresponding to the signal level magnitude of the local maxima; performing a circular time index shift on each retrieved signal in order to align the peak of the shifted signal with the corresponding local maxima sample of the original OFDM communication signal; performing a phase rotation on the shifted signal so that the phase angle of its peak sample is equal to that of the local maxima sample of the original OFDM communication signal, to form a sub-cancellation signal; and summing all of the sub-cancellation signals to construct the cancellation signal.

In accordance with another aspect of the presently described subject matter, there is provided a method of reducing the signal level peaks of a digital OFDM communication signal comprising: reserving a set of subcarriers to be used for data transmission; reserving a set of subcarriers to be used for peak cancellation; constructing a database of frequency domain filtering coefficients based on a user-defined target peak threshold and the set of reserved tones; analyzing the incoming OFDM communication signal to determine the sample index location and magnitude of its highest signal level peak in the time domain; constructing a cancellation signal which is added to the incoming OFDM communication signal to reduce its signal level peaks; wherein the construction of the cancellation signal involves: retrieving a set of filtering coefficients from the database corresponding to the magnitude of the peak sample found in the analysis process; processing the incoming OFDM communication signal to produce a clipped signal by setting the magnitude of any sample exceeding the threshold to the threshold value while maintaining the phase angle of each sample; constructing a residual signal by subtracting the clipped signal from the reference signal; transforming the residual signal into the frequency domain by using a Discrete Fourier Transform; filtering the residual signal by applying the retrieved set of coefficients to the frequency domain representation of the residual signal; and transforming the filtered residual signal into the time domain by using an Inverse Discrete Fourier Transform to produce the cancellation signal.

BRIEF DESCRIPTION OF THE DRAWINGS

For a fuller understanding of the nature and advantages of the disclosed subject matter, as well as the preferred modes of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

The following description of preferred embodiments is merely exemplary in nature and is in no way intended to limit the invention, its application, or uses. The PAPR reduction methods and systems of the present invention may take form in a number of different embodiments depending upon the particular requirements of the use.

A. Time-Domain PAPR Reduction

The time-domain PAPR reduction method and system creates a database of canceling signals for different levels of peak magnitudes, then reuses them to reduce the peaks of symbols having the same magnitudes. This is done in two stages. The first stage is called a learning stage, which initializes a set of peak reduction signals corresponding to the clipping noise of different maximum magnitudes. This stage can be done offline and updated regularly when needed. The second stage is an online process, which combines the conventional TR and some pre-processing steps using the canceling signals developed in the first stage.

Figure 1:
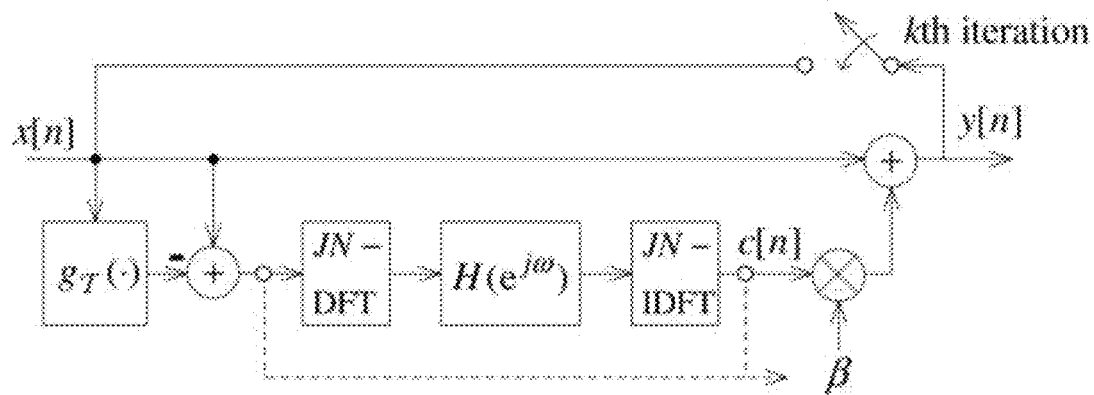
FIG. 1 shows a conventional prior art clipping and filtering TR algorithm.
Figure 2:
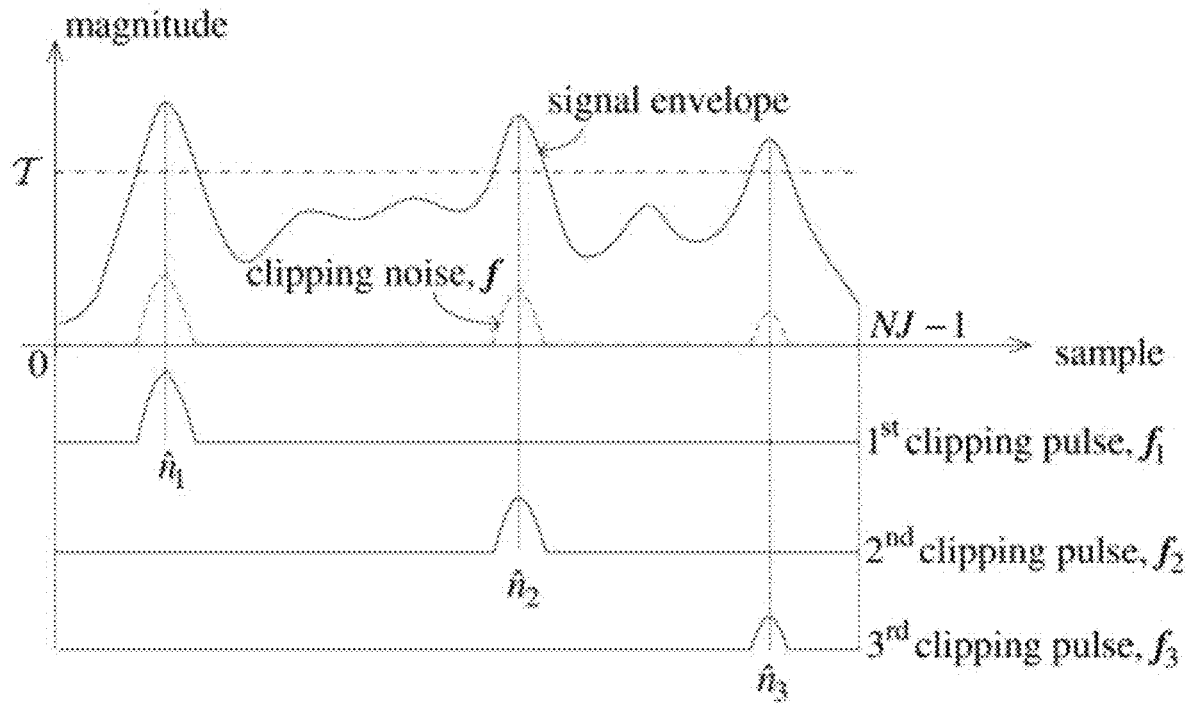
FIG. 2 is a representative illustration of clipping noise and clipping pulses in the time domain PAPR reduction method of the present invention.

Provided that T is large enough, the authors in [14] show that the clipping noise defined in (13) can be approximated by a sum of constant-phase parabolic pulses, with each pulse has one local minimum or maximum. As an example, FIG. 2 plots a symbol having one dominant peak above T and its corresponding clipping noise. In order to effectively reduce this peak, the most effective signal c should be the one that closely resembles the inverse of the clipping pulse. Due to the property of having a constant phase around over-threshold samples, the signal c can be reused to cancel other clipping pulses with the same peak magnitude by cyclic-shifting it to align with the pulse location and phase shifting it to align with the complex phase of the pulse. Since cyclic-shifting a signal in the time domain and performing a phase rotation does not change its frequency components, the newly shifted time signal still contains only those tones which are reserved for peak reduction.

1) Stage 1—Learning:

Given T, a set of possible levels of peak magnitude is formed as:

$$\mathcal{L}_\mathcal{T} = \{\mathcal{T}_i = \mathcal{T} + i\delta_\mathcal{T}, 1 \leq i \leq q, \delta_\mathcal{T} > 0\} \quad (23)$$

where $\delta_\mathcal{T}$ is the step size and $\mathcal{T}_q$ is the maximum peak amplitude. A large number of randomized OFDM symbols is then generated and their peak amplitudes are recorded and classified into q sets:

$$\mathcal{B}_i = \{x : \mathcal{T}_i \max|x| \leq \mathcal{T}_{i+1}, i=1, \ldots, q\} \quad (24)$$

For each set in (24), a reference signal is constructed as:

$$\hat{x}_i = \frac{1}{|\mathcal{B}_i|} \sum_{x \in \mathcal{B}_i} \mho_{-\hat{n}}(xe^{-j\angle x[\hat{n}]}) \quad (25)$$

where $x[\hat{n}]$ is the sample of x having the maximum magnitude. The reference signal in (25) is obtained in three steps. The first step cancels the phase of the highest peak sample. Second, the time samples are cyclically shifted to the original time index. After this, the OFDM symbols in $\mathcal{B}$ are all aligned at 0 index, with roughly zero phase for samples around the zero index, and uncorrelated phases for other samples. This causes their sum in the third step to have a high ratio between its major lobe and side lobes. Moreover, the reference signal still has the same frequency tones as the OFDM symbols since averaging and phase shifting do not introduce any new frequency content.

For each reference signal, the corresponding peak canceling signal is found to reduce its peak below $\mathcal{T}$. This can be achieved by applying the conventional TR technique to produce:

$$\hat{c}_{\mathcal{T},i} \leftarrow TR(\hat{x}_i, k, \mathcal{T}) \quad (26)$$

The first stage finishes by finding a set of peak canceling signals $$\mathcal{C}_\mathcal{T} = \{\hat{c}_{\mathcal{T},1}, \ldots, \hat{c}_{\mathcal{T},q}\} \quad (27)$$

2) Stage 2—Peak-Reduction Loop:

The second stage reduces the peak for each OFDM symbol iteratively. At the kth step of the algorithm, the residual signal vector $f_k = x + c_k - g_\mathcal{T}(x = c_k)$ is approximated by $P_k$ clipping pulses:

$$f_k \approx \sum_{i=1}^{P_k} f_{k,i} \quad (28)$$

where $f_{k,i}$ is the ith pulse. Each clipping pulse has a maximum peak magnitude sample, which is the set of peak samples in $f^k$ (see FIG. 2):

$$\mathfrak{P}_k = \{\hat{n} : |f_k[\hat{n}]| \geq \max(|f_k[\hat{n}-1]|, |f_k[\hat{n}+1]|)\} \quad (29)$$

The number of clipping pulses is equal to the number of elements in this set, that is $|\mathfrak{P}_k| = P_k$. For each clipping pulse $f_{k,i}$, which has the peak magnitude sample at $\hat{n}_i \in \mathfrak{P}_k$, a corresponding level index of the ith pulse is found by:

$$\ell_{k,i} = \min\left(\left\lfloor \frac{\max|f_{k,i}|}{\delta_\mathcal{T}} \right\rfloor, q\right) \quad (30)$$

Since $$\max|f_{k,i}| = |f_{k,i}[\hat{n}_i]| = |f_k[\hat{n}_i]|$$

Equation (30) can be simplified to:

$$\ell_{k,i} = \min\left(\left\lfloor \frac{|f_k[\hat{n}_i]|}{\delta_{\mathcal{T}}} \right\rfloor, q\right) \quad (31)$$

Then, a canceling signal for $f_{k,i}$ is obtained by:

$$\hat{f}_{k,i} = \mho_{\hat{n}_i}(\hat{C}_{\mathcal{T}, \ell_k, i} e^{+\angle f_{k,i}[\hat{n}_i]}) \approx f_{k,i} \quad (32)$$

The canceling signal is then constructed by:

$$c_{k+} = c_k - \sum_{i=1}^{P_k} \hat{f}_{k,i} \quad (33)$$

Figure 3:
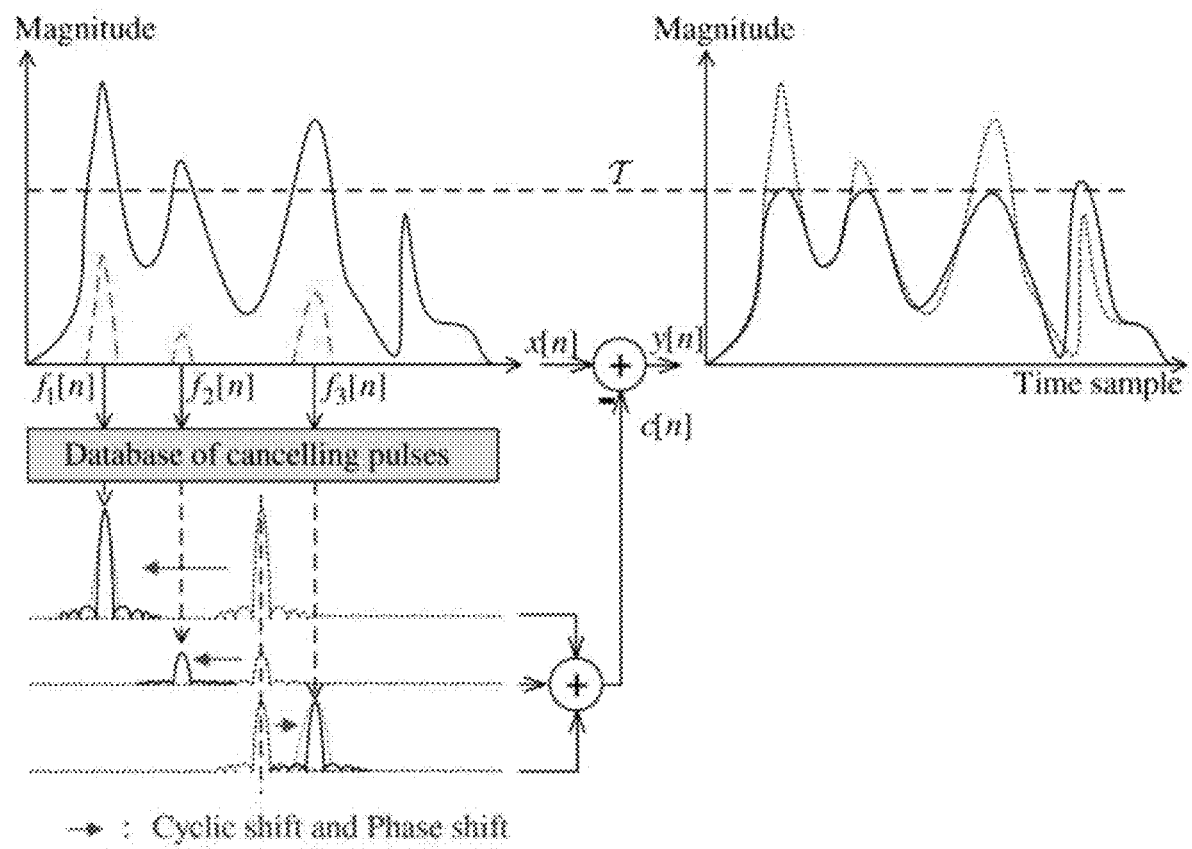
FIG. 3 is a representative illustration of the iterative operation of the time domain PAPR reduction method of the present invention.

The process repeats until either a maximum number of iterations is reached or all the samples in the peak-reduced signal vector are below the threshold T. The time-domain PAPR reduction method is illustrated in FIG. 3.

In summary, the time-domain PAPR reduction method and system is outlined below.

Learning Stage
(i) INPUT: Kernel vector k; threshold $\mathcal{T}$; set $\mathcal{D}$; set $\mathcal{R}$
(ii) INITIALIZATION:
  Initialize q, resolution $\delta_{\mathcal{T}}$, set $\mathcal{L}_{\mathcal{T}}$ as in (23)
  Initialize q sets $\mathcal{B}_1 = \ldots = \mathcal{B}_q = \emptyset$
  Randomly generate a large number of OFDM symbols with data tones $\mathcal{D}$.
(iii) LEARNING:
  a) Classify OFDM symbols into q sets as in (24)
  b) Generate reference signals, and their canceling signals using (25), (26)
  c) After all symbols are tried, RETURN $\mathcal{C}_{\mathcal{T}}$ Peak-Reduction Stage
(i) INPUT: Symbol vector x; Kernel vector k; Threshold $\mathcal{T}$; Number of iterations $N_{it}$; Canceling signal set $\mathcal{C}_{\mathcal{T}}$
(ii) INITIALIZATION: Loop variable k=1; $c_k$=0;
(iii) LOOP_BEGIN:
  Determine set of peak samples in clipping noise using (29)
  Calculate $c_{k+1}$ using (31), (32) and (33)
(iv) LOOP_END:
  IF (k>$N_{it}$) RETURN $y_{k+1} = c_{k+1} + x$
  ELSE k=k+1, jump LOOP_BEGIN A single iteration of the time-domain PAPR reduction method requires $4P_k JN$ real multiplications and $2P_k JN$ additions. Since $P_k \ll |\mathcal{M}_k|$, the number of multiplications and additions per iteration of the time-domain PAPR reduction method are significantly less than the corresponding numbers of a conventional GTR algorithm as discussed in the background above. Moreover, the novel PAPR reduction method does not need to try different values of γ to obtain the optimal amount of peak reduction.

Those of skill in the art will note that the system complexity grows with the number of iterations. Therefore reducing the number of iterations helps to reduce the cost of the PAPR reduction process. The time-domain PAPR reduction method helps to transfer most of the computational cost to offline processing steps, which can be regularly updated upon changes in the frequency settings. As can be seen in the Simulation Result below, the additional step of pre-calculating the canceling signals makes the time-domain PAPR reduction method converge in a smaller number of iterations than GTR, thereby further reducing the computational cost.

B. Frequency domain PAPR Reduction

The frequency-domain PAPR reduction method described herein uses pre-calculated canceling signals. In contrast to a conventional CFTR algorithm and method, which applies unity gain to each reserved tone via $H(e^{j\omega})$ in (18), the frequency-domain PAPR reduction method establishes a potentially different gain for each reserved tone. The frequency-domain PAPR reduction method has two stages. The first stage calculates the gain coefficients offline. The second stage is an online process, which iteratively reduces the peak using the precomputed gains.

Recall that the clipping noise f in (13) can be approximated by a sum of $P_k$ clipping pulses as $f = \sum_{i=1}^{P_k} f_i$, where $f_i$ is the ith clipping pulse with its maximum amplitude at $\hat{n}_i$. Then the peak canceling signal can be constructed as a combination of different single canceling pulses:

$$c = \sum_{i=1}^{P_k} c_i \quad (34)$$

where $c_i$ is the ith canceling pulse, such that $c_1 \approx -f_i$ in order to make $c \approx -f$.

Consider two clipping pulses, $f_i$ and $f_j$ having the same peak magnitude at some level, denoted as $$\ell = \max|f_i| = \max|f_j| \quad (35)$$

Because of the property of constant-phase near their maximum, the clipping pulses can be approximated by a cyclic shift with an appropriate amount of phase rotation:

$$f_j \approx e^{j(\angle f_j[\hat{n}_j] - \angle f_i[\hat{n}_i])} \mho_{\hat{n}_j - \hat{n}_i}(f_i) \quad (36)$$

where $f_i[\hat{n}_i]$ and $f_j[\hat{n}_j]$ are the samples of $f_i$, and $f_j$ having the maximum magnitudes, respectively. Equation (36) suggests that the canceling pulse for $f_j$ can also be derived from the one used to cancel $f_i$, that is:

$$c_j \approx e^{j(\angle f_j[\hat{n}_j] - \angle f_i[\hat{n}_i])} \mho_{\hat{n}_j - \hat{n}_i}(c_i) \quad (37)$$

Let $C_i = [C_i[0], \ldots, C_i[NJ-1]]$ and $F_i = [F_i[0], \ldots, F_i[NJ-1]]$, respectively, be the corresponding frequency vectors of $c_i$ and $f_i$ obtained from DFT operations. Then it follows from (36) that:

$$F_j[k] = \mathcal{F}\{f_j\}|_k; \quad (38)$$
$$(0 \le k \le NJ-1) \approx e^{j(\angle f_j[\hat{n}_j] - \angle f_i[\hat{n}_i])} \mathcal{F}\{\mho_{\hat{n}_j - \hat{n}_i}(f_i)\}|_k \approx$$
$$e^{j(\angle f_j[\hat{n}_j] - \angle f_i[\hat{n}_i])} e^{-j2\pi(\hat{n}_j - \hat{n}_i)k/NJ} \mathcal{F}\{f_i\}|_k \approx$$
$$e^{j(\angle f_j[\hat{n}_j] - \angle f_i[\hat{n}_i])} e^{-j2\pi(\hat{n}_j - \hat{n}_i)k/NJ} F_i[k]$$

Similarly, it follows from (37) that:

$$C_j[k] \approx e^{j(\angle f_j[\hat{n}_j] - \angle f_i[\hat{n}_i])} e^{-j2\pi(\hat{n}_j - \hat{n}_i)k/NJ} C_i[k] \quad (39)$$

where $0 \le k \le NJ-1$. Thus, comparing (38) and (39) yields:

$$g_\ell[k] = \frac{C_j[k]}{F_j[k]} \approx \frac{C_i[k]}{F_i[k]}; (0 \le k \le NJ-1) \quad (40)$$

Equation (40) infers that the ratios of the frequency components between the clipping pulses of the same peak magnitudes and their canceling pulses are approximately constant. For each level $\mathcal{L}_{\mathcal{T}}$, these ratios are defined as a coefficient vector $\boldsymbol{g}_\ell = [g_\ell[0], \ldots, g_\ell[NJ-1]]$. Using such a coefficient vector, the canceling pulse of a clipping pulse $\tilde{f}$ whose peak magnitude is at level $\mathcal{L}_{\mathcal{T}}$ can be obtained by:

$$\tilde{c} = \mathcal{F}^{-1}\{\boldsymbol{g}_\ell \mathcal{F}\{\tilde{f}\}\} \quad (41)$$

Equation (41) helps to construct a canceling pulse from the frequency vector of a clipping pulse and the corresponding coefficients. Based on the above analysis, the frequency-domain PAPR reduction method is performed in two stages. The first stage, also called a learning stage, initializes a set of coefficient vectors corresponding to different levels of clipping pulses. This stage can be done offline and updated regularly when needed. The second stage is an online process that processes the clipping noise in the frequency domain with the suitable coefficients developed from the first stage to iteratively construct a peak canceling signal.

1) Stage 1—Learning:

This stage has the same steps discussed above in relation to the time-domain PAPR reduction method. Specifically, the reference signals constructed as in (25) are clipped:

$$\hat{f}_{T,i} = \hat{x} g_T(\hat{x}_i) \qquad (42)$$

The q coefficient vectors are calculated as:

$$g_{T,i} = \frac{\mathcal{F}\{\hat{c}_{T,i}\}}{\mathcal{F}\{\hat{f}_{T,i}\}} \qquad (43)$$

where $\hat{c}\hat{c}_{T,i}$ is given by (26).

The stage finishes by finding a set of coefficient vectors $$\mathcal{G}_T = \{g_{T,0}, \ldots, g_{T,q}\} \qquad (44)$$

2) Stage 2—Peak-Reduction Loop:

The second stage reduces the peak of each symbol iteratively. At the kth iteration, the clipping noise vector $f_k = x + c_k - g_T(x + c_k)$ is also approximated by $P_k$ clipping pulses as in (28). For simplicity, only the clipping pulse of highest peak magnitude is selected $$\tilde{f}_k = \arg\max_{1 \le i \le P_k} |f_{k,i}| \qquad (45)$$

The corresponding level of $\tilde{f}_k$ is obtained as in (30). Then the canceling signal for the next iteration is:

$$c_{k+1} = \mathcal{F}^{-1}\{g_{\ell_k} \mathcal{F}\{\tilde{f}_k\}\} \qquad (46)$$

Figure 4:
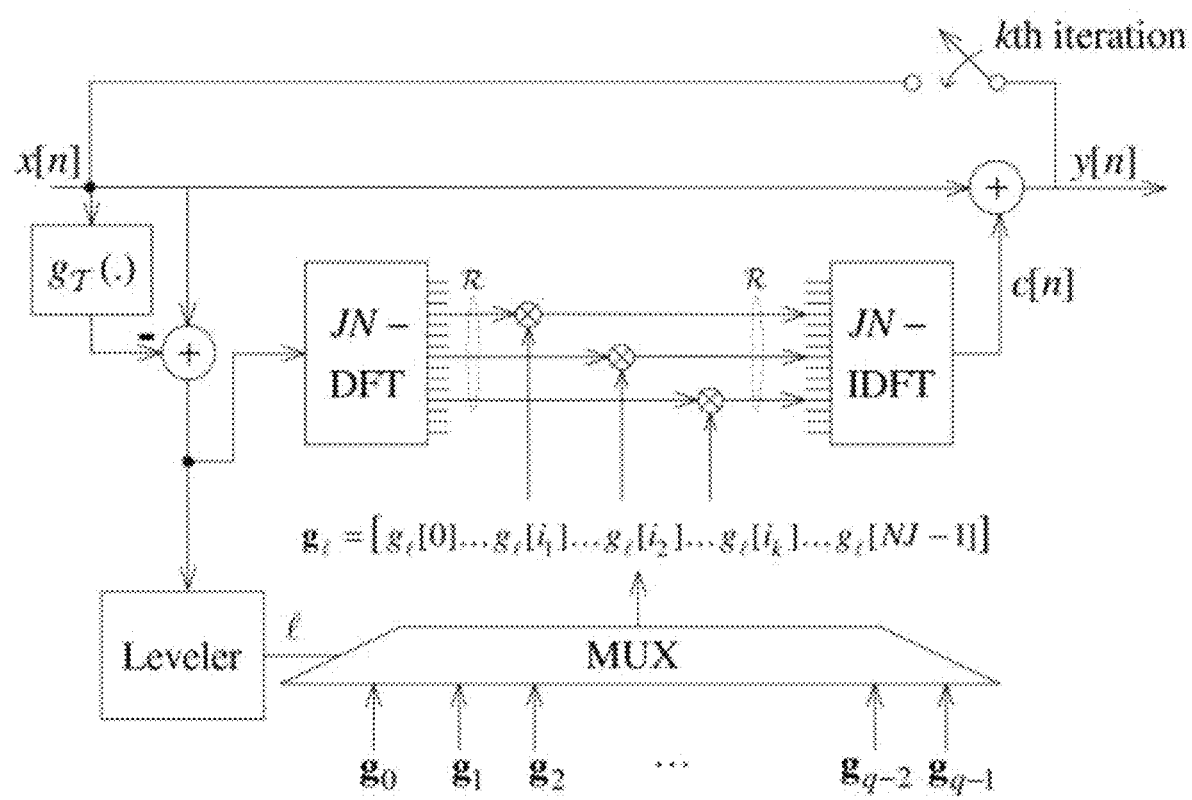
FIG. 4 illustrates a representative hardware implementation structure for the frequency domain PAPR reduction method of the present invention.

The peak-reduction loop is illustrated in FIG. 4. The purpose of the leveler block in the figure is to conduct the operation in (30). All of the coefficient vectors calculated from the learning stage can be stored in a memory, and a multiplexer (MUX) structure is used to fetch a corresponding coefficient vector at run-time.

The novel frequency-domain PAPR reduction method reduces the computational complexity of the CFTR algorithm. Thanks to the coefficients found in the learning stage, the online processing stage removes the need for calculating β and scaling the time domain vector as in the conventional approach. In addition, the division operations are removed from the proposed scheme, and the number of multiplications per iteration is:

$$\mathcal{M}_p = \mathcal{M}_{DFT} + \mathcal{M}_{IDFT} + 4|\mathcal{R}| \qquad (47)$$

where $4|\mathcal{R}|$ multiplications are used to generate the canceling signal in (46). Since $|\mathcal{R}| \ll JN$, the complexity of the novel frequency-domain PAPR reduction method is much smaller than that of the conventional CFTR algorithm. As outlined below, simulation results reveal that the performance of the novel frequency-domain PAPR reduction method is comparable to that of the conventional CFTR algorithm.

Compared to the novel time-domain PAPR reduction method, the novel frequency-domain PAPR reduction method has fewer multiplications per iteration. In addition, the DFT/IDFT operations can be efficiently implemented using FFT/IFFT algorithms. Therefore the novel frequency-domain PAPR reduction method is very attractive for practical applications.

C. Simulation Results

In each simulation, $10^6$ OFDM symbols are generated using a 1024-QAM constellation, 1024-length IFFT block (N=1024), and an oversampling factor J=8. Two different sets of reserved tones are simulated. In the first case, G=50 tones, which is approximately 5% of the available tones, are selected randomly. Hence the number of data tones is N−G=1024−50=974. The second case considers G=100 tones, which are also randomly selected, and the corresponding number of data tones is G=1024−100=924. For each of these two cases, two different target PAPR levels and corresponding thresholds $\mathcal{T}$ are tested, namely 8 dB and 10 dB. The learning stage was run over 5×10⁵ OFDM symbols. The quantization level $\delta \mathcal{T}$ was set to provide a resolution of 0.1 dB. This means, for example, in the case of 8 dB threshold, $\mathcal{B}_0$ consists of signals with PAPR in the range [8 dB, 8.1 dB], $\mathcal{B}_1$ for the signals with PAPR in [8.1 dB, 8.2 dB] and so on. Extensive testing indicates that this value of $\delta_\mathcal{T}$ provides fine enough resolution for the reference signals.

Figure 5:
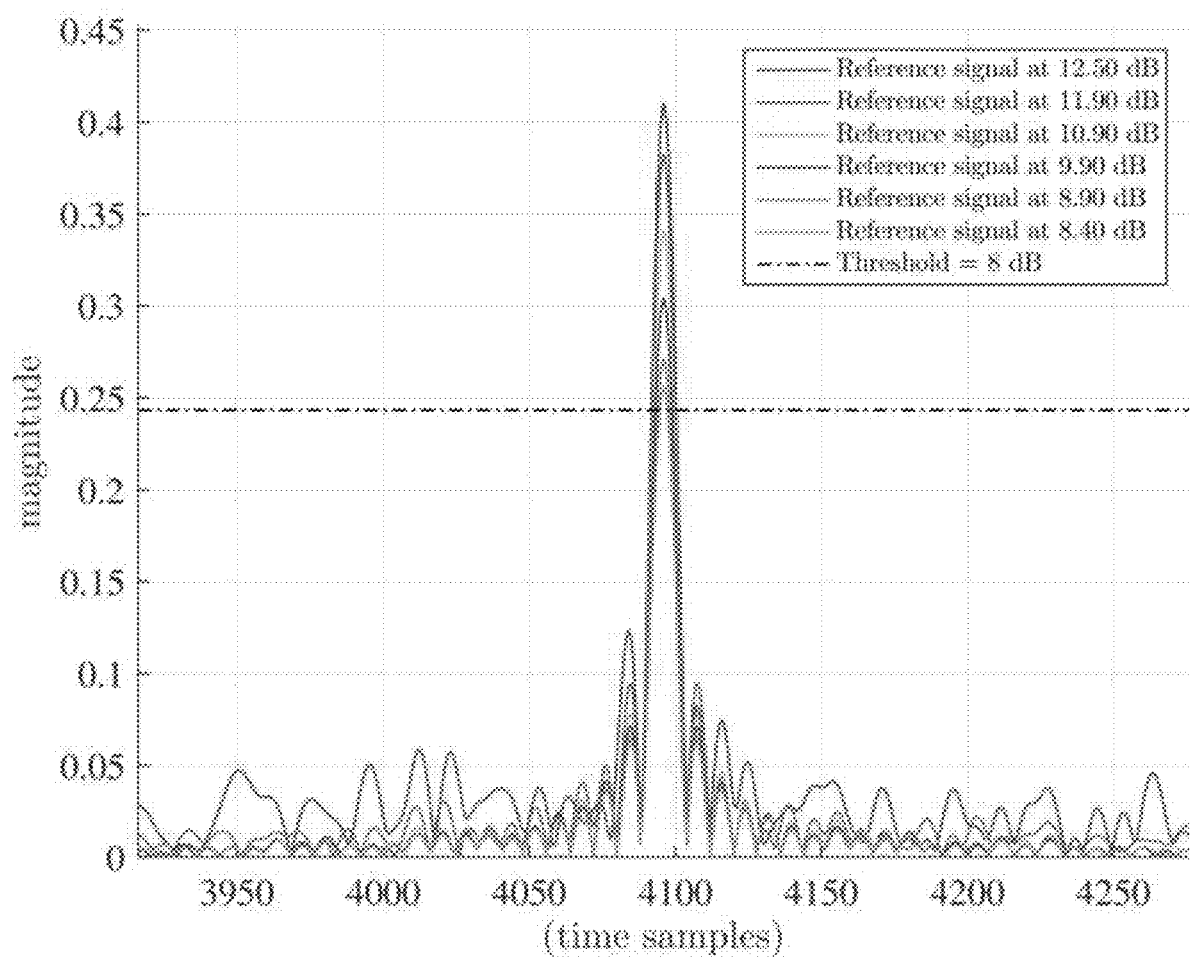
FIG. 5 shows representative reference signals with G=100 reserved tones, and target PAPR of 8 dB.

FIG. 5 shows examples of reference signals of different peak levels. The levels are measured in dB with respect to the average magnitude of OFDM symbols. It is interesting to see that the main lobes of all reference signals have essentially the same width, while the side lobe levels are much smaller when compared to side-lobes of random OFDM signals.

Figure 6:
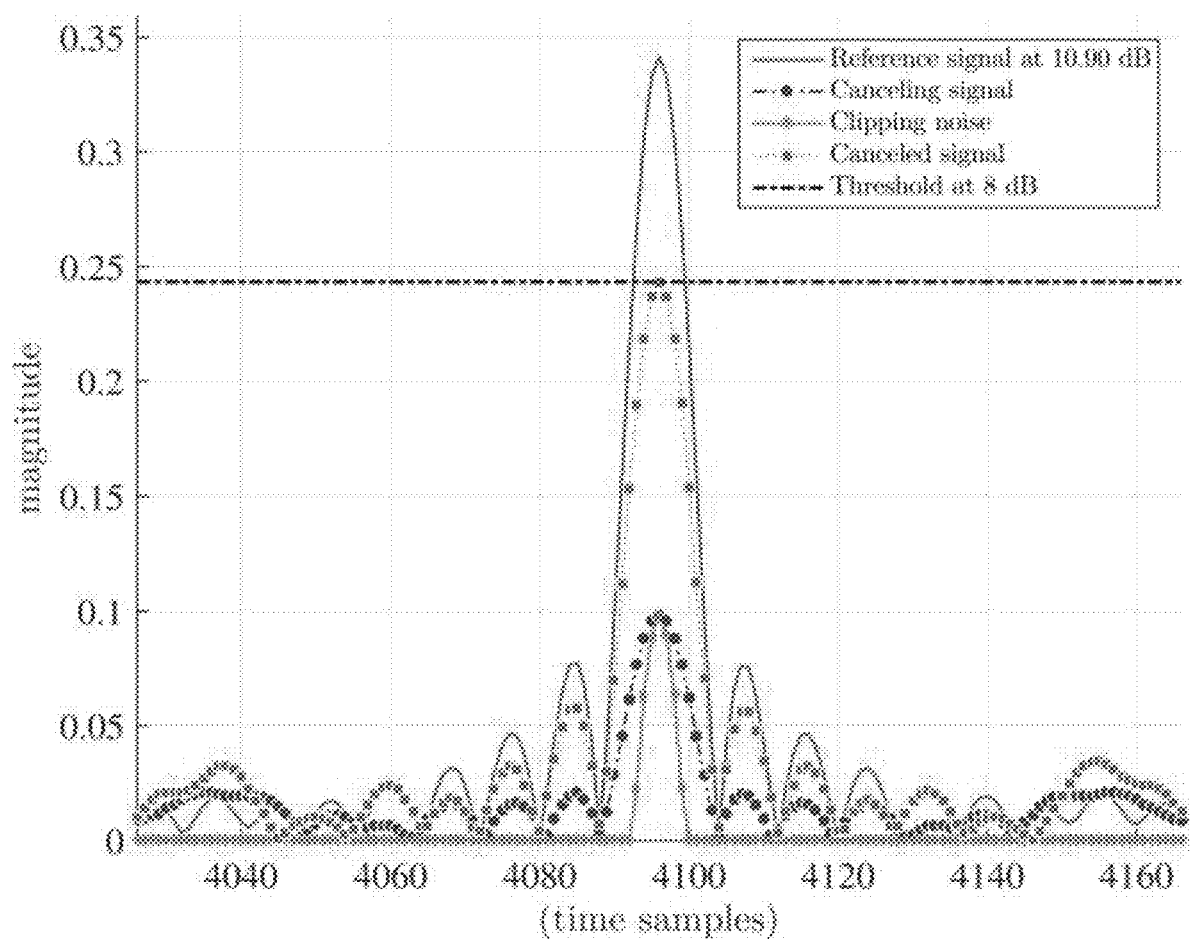
FIG. 6 shows simulation results regarding a reference signal and its canceling signal with G=100 reserved tones, and target PAPR of 8 dB.
Figure 7:
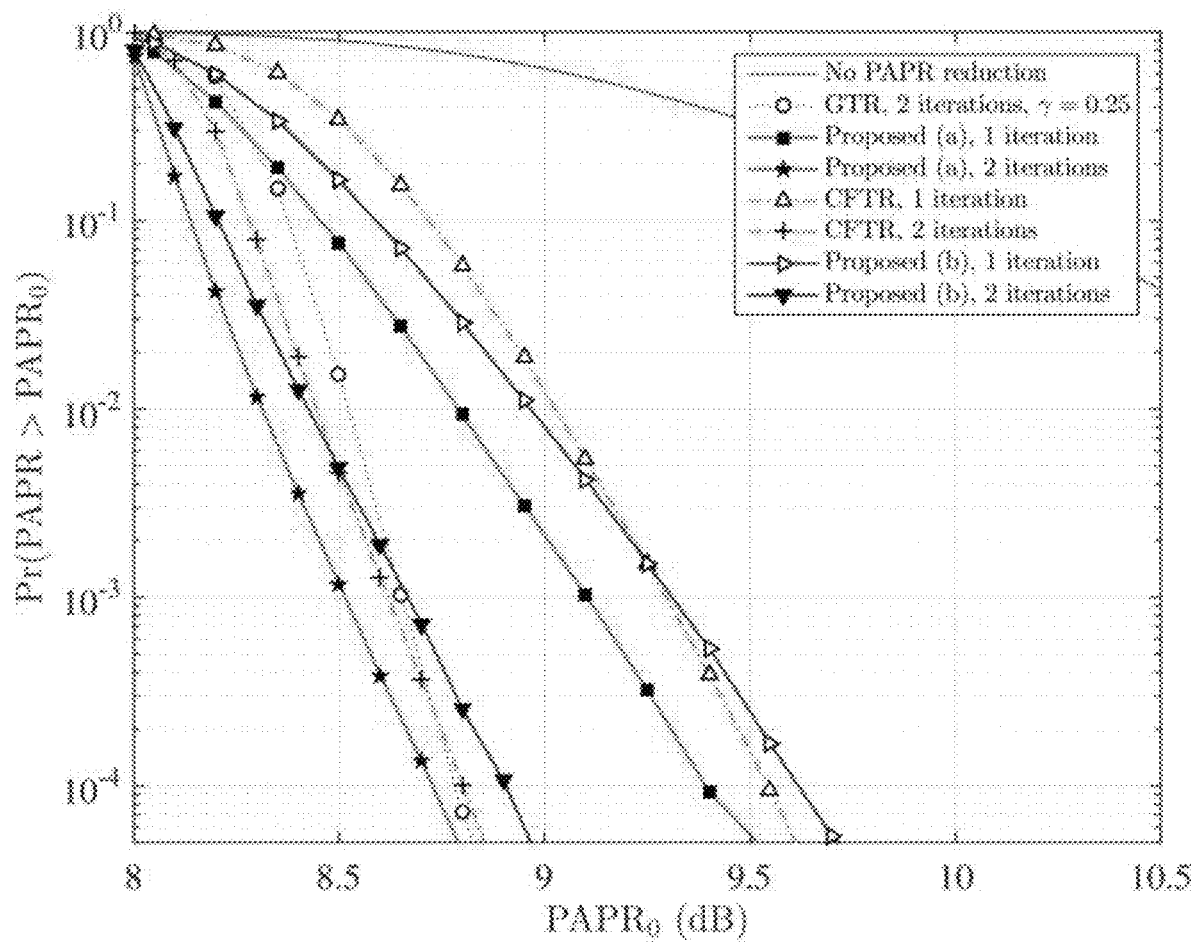
FIG. 7 shows a simulation result comparison of PAPR reduction for different methods G=50 random reserved tones with target PAPR, $\mathcal{T}$ =8 dB. "Proposed (a)" represents use of the time domain PAPR reduction method of the present invention; and "Proposed (b)" represents use of the frequency domain PAPR reduction method of the present invention.
Figure 8:
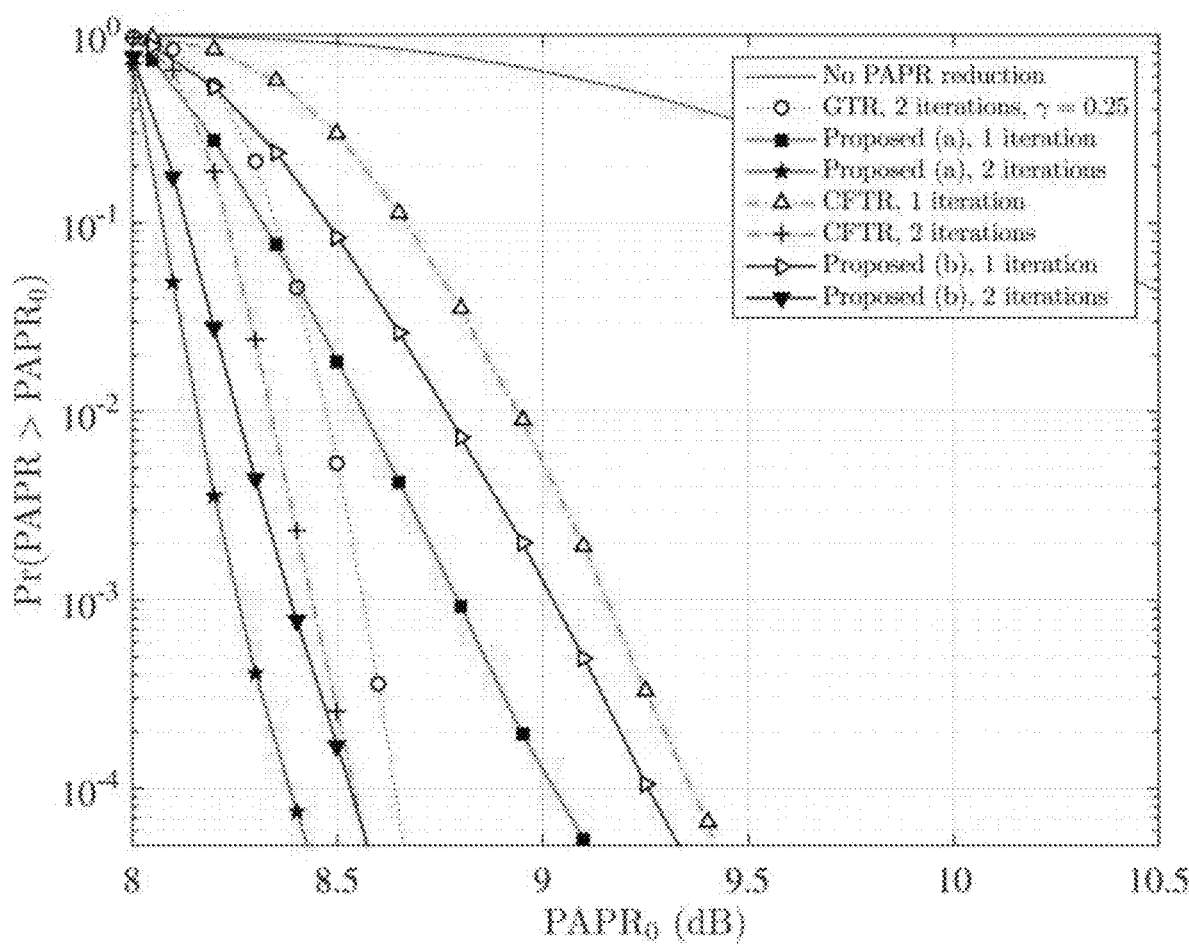
FIG. 8 shows a simulation result comparison of PAPR reduction for different methods G=100 random reserved tones with target PAPR, $\mathcal{T}$ =8 dB. "Proposed (a)" represents use of the time domain PAPR reduction method of the present invention; and "Proposed (b)" represents use of the frequency domain PAPR reduction method of the present invention.
Figure 9:
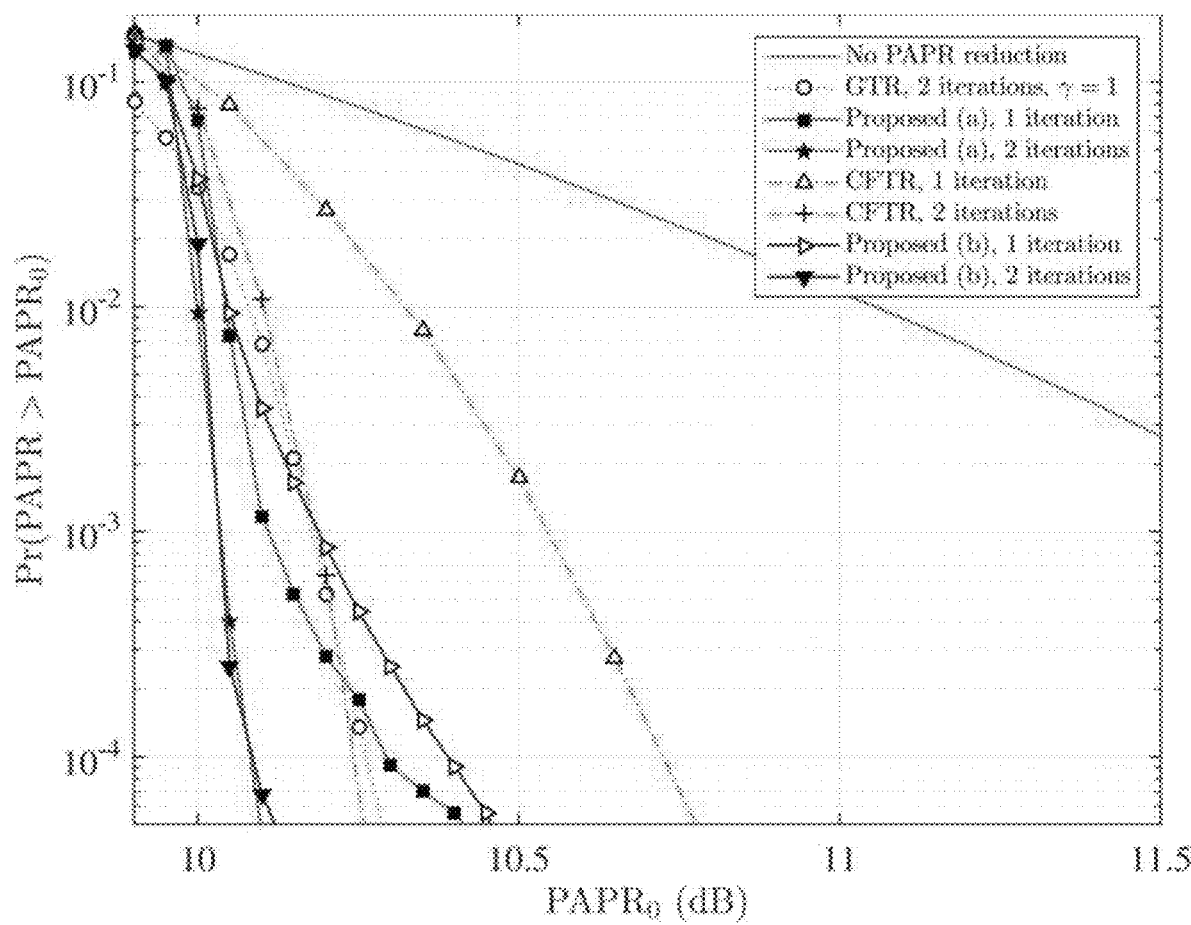
FIG. 9 shows a simulation result comparison of PAPR reduction for different methods G=50 random reserved tones with target PAPR, $\mathcal{T}$ =10 dB. "Proposed (a)" represents use of the time domain PAPR reduction method of the present invention; and "Proposed (b)" represents use of the frequency domain PAPR reduction method of the present invention.
Figure 10:
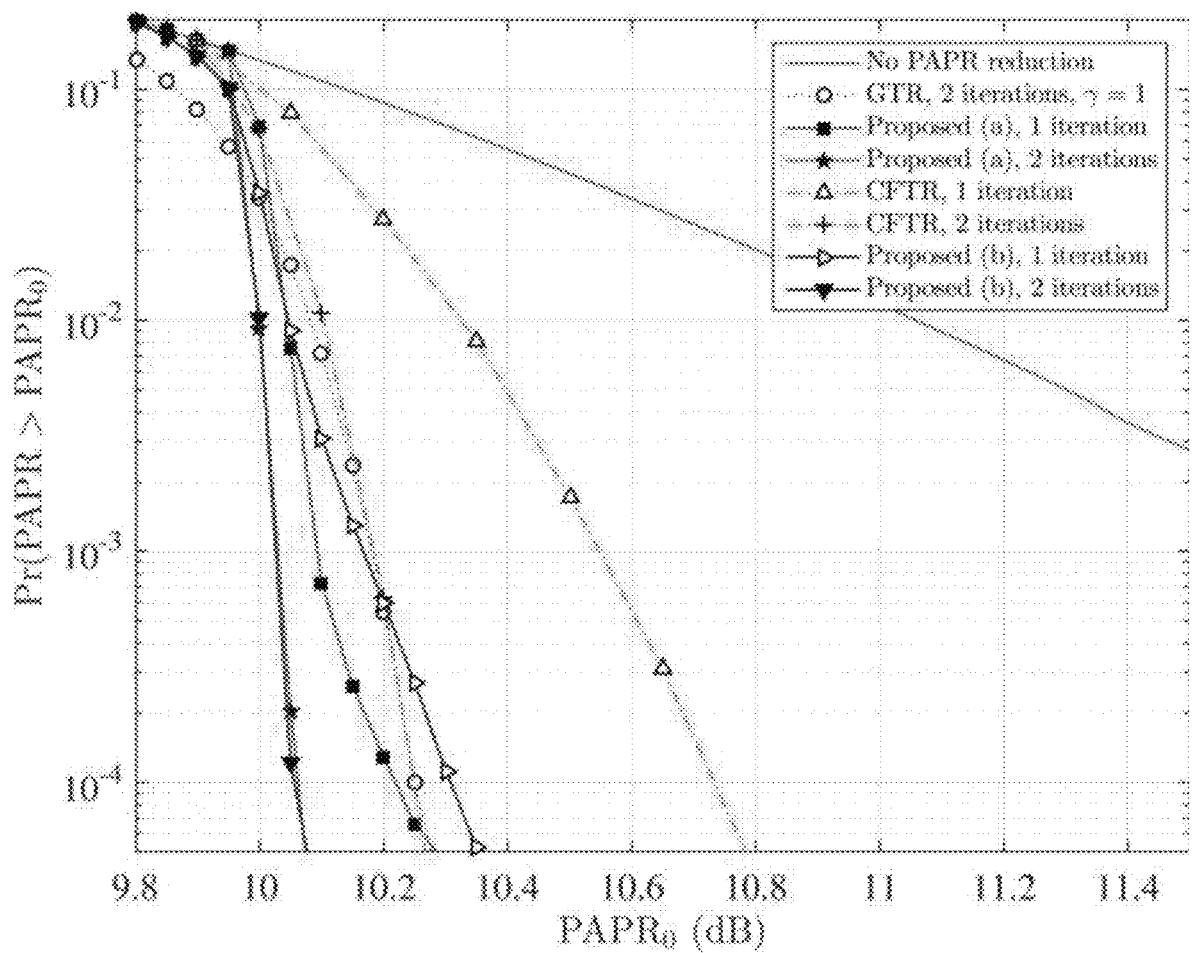
FIG. 10 shows a simulation result comparison of PAPR reduction for different methods G=100 random reserved tones with target PAPR, $\mathcal{T}$ =10 dB. "Proposed (a)" represents use of the time domain PAPR reduction method of the present invention; and "Proposed (b)" represents use of the frequency domain PAPR reduction method of the present invention.

FIG. 6 presents an example of a reference signal with a maximum magnitude of 10.9 dB, its clipping noise, the corresponding canceling signal and the canceled signal obtained by subtracting the canceling signal from the reference signal. FIGS. 7 and 8 compare the PAPR reduction performance of different algorithms with a target PAPR of 8 dB using 50 and 100 reserved tones, respectively. Similarly, FIGS. 9 and 10 report results for a target PAPR of 10 dB. In all cases, the CCDF curves with 1 iteration and 2 iterations of the proposed algorithms are compared against those of the conventional GTR and CFTR algorithms having the same number of iterations. For the conventional GTR algorithm, different values of scaling factor y are tested: 0.01, 0.05, 0.1, 0.15, 0.2, 0.25, 0.5 and 1. The scaling factor yielding the best peak reduction performance after 2 iterations was selected and indicated in the figure's legend.

FIGS. 7 to 10 show that for both $\mathcal{T}$=8 dB and $\mathcal{T}$=10 dB, the novel time-domain and frequency-domain PAPR reduction methods generally provide slightly better peak reduction than conventional algorithms and methods. As expected, the results indicate that reserving more tones provides better PAPR reduction. Specifically, at $\mathcal{T}$=8 dB and probability of $10^{-4}$, doubling the number of reserved tones from 50 to 100 can increase the peak reduction performance by approximately 0.5 dB.

For the higher threshold of $\mathcal{T}$=10 dB, the novel time-domain and frequency-domain PAPR reduction methods can provide the same performance with one iteration as conventional algorithms and methods achieve in two iterations, which is approximately 0.6 dB better than the conventional CFTR achieves in one iteration. Moreover, it is noted that the computational complexity of the novel time-domain and frequency-domain PAPR reduction methods, even when two iterations are used, is still much lower than that of the conventional GTR and CFTR algorithms.

The present description is of the best presently contemplated mode of carrying out the subject matter disclosed herein. The description is made for the purpose of illustrating the general principles of the subject matter and not to be taken in a limiting sense; the described subject matter can find utility in a variety of implementations without departing from the scope of the invention made, as will be apparent to those of skill in the art from an understanding of the principles that underlie the invention.

We claim:

1. A method of reducing the signal level peaks of a digital OFDM communication signal comprising:
    reserving a set of subcarriers to be used for data transmission;
    reserving a set of subcarriers to be used for peak cancellation;
    constructing a database of cancellation signals based on a user-defined target peak threshold and the set of reserved tones;
    analyzing the incoming OFDM communication signal to determine the sample index locations and magnitudes of its signal level peaks in the time domain;
    constructing a cancellation signal which is added to the incoming OFDM communication signal to reduce its signal level peaks;
    wherein the analysis process involves:
        identifying a set of samples within the OFDM communication signal having their signal level magnitude exceed the user-defined target peak threshold;
        locating those samples in the identified set which correspond to signal level local maxima of the OFDM communication signal;
        determining the magnitudes and phase angles of the local maxima found;
    wherein the construction of the cancellation signal involves:
        for each local maxima found in the analysis process, retrieving a signal from the database corresponding to the signal level magnitude of the local maxima;
        performing a circular time index shift on each retrieved signal in order to align the peak of the shifted signal with the corresponding local maxima sample of the original OFDM communication signal;
        performing a phase rotation on the shifted signal so that the phase angle of its peak sample is equal to that of the local maxima sample of the original OFDM communication signal, to form a sub-cancellation signal; and
        summing all of the sub-cancellation signals to construct the cancellation signal.

2. The method of claim 1, wherein the construction of the database is performed as follows:
    defining a set of quantized peak magnitude level thresholds;
    generating a large number of randomized OFDM signals having the same sets of data tones and reserved tones as the signal whose peak is to be reduced;
    performing a circular time index shift on each signal so that the peak magnitude sample resides at the first time index;
    performing a phase rotation on each shifted signal so that the sample at the first time index has a phase angle of zero;
    classifying each phase-rotated signal into one of a plurality of groups based on comparisons of its peak magnitude to the set of quantized peak magnitude level thresholds as defined in Equation (23);
    calculating a reference signal for each of the groups by averaging its signals sample-by-sample;
    constructing a peak cancellation signal for each reference signal which can reduce the peak magnitude level of the reference signal below the target peak threshold; and
    collecting the constructed peak cancellation signals to form a database.

3. The method of claim 2, wherein the construction of the peak cancellation signal for each reference signal is performed through the following steps:
    processing the reference signal to produce a clipped signal by setting the magnitude of any sample exceeding the threshold to the threshold value while maintaining the phase angle of each sample;
    constructing a residual signal by subtracting the clipped signal from the reference signal;
    transforming the residual signal into the frequency domain by performing a Discrete Fourier Transform;
    applying a projection filter to the frequency domain signal by retaining only those frequency components which belong to the set of reserved tones while zeroing other frequency components;
    transforming the filtered signal into the time domain by using an Inverse Discrete Fourier Transform; and
    constructing a peak cancellation signal by scaling the time domain representation of the filtered signal with an appropriate scaling factor.

4. The method of claim 2, wherein the construction of the database is performed in an offline fashion or in an external piece of hardware and updated periodically in response to changes in the sets of data tones or reserved tones.

5. A method of reducing the signal level peaks of a digital OFDM communication signal comprising:
    reserving a set of subcarriers to be used for data transmission;
    reserving a set of subcarriers to be used for peak cancellation;
    constructing a database of frequency domain filtering coefficients based on a user-defined target peak threshold and the set of reserved tones;
    analyzing the incoming OFDM communication signal to determine the sample index location and magnitude of its highest signal level peak in the time domain;
    constructing a cancellation signal which is added to the incoming OFDM communication signal to reduce its signal level peaks;
    wherein the construction of the cancellation signal involves:
        retrieving a set of filtering coefficients from the database corresponding to the magnitude of the peak sample found in the analysis process;
        processing the incoming OFDM communication signal to produce a clipped signal by setting the magnitude of any sample exceeding the threshold to the threshold value while maintaining the phase angle of each sample;
        constructing a residual signal by subtracting the clipped signal from the reference signal;
        transforming the residual signal into the frequency domain by using a Discrete Fourier Transform;
        filtering the residual signal by applying the retrieved set of coefficients to the frequency domain representation of the residual signal; and transforming the filtered residual signal into the time domain by using an Inverse Discrete Fourier Transform to produce the cancellation signal.

6. The method of claim 5, wherein the construction of the database is performed as follows:
defining a set of quantized peak magnitude thresholds
generating a large number of randomized OFDM signals having the same sets of data tones and reserved tones as the signal whose peak is to be reduced
performing a circular time index shift on each signal so that the peak magnitude sample resides at the first time index;
performing a phase rotation on each shifted signal so that the sample at the first time index has a phase angle of zero;
classifying each phase-rotated signal into one of a plurality of groups based on comparisons of its peak magnitude to the set of quantize peak magnitude level thresholds as defined in Equation (23);
calculating a reference signal for each of the groups by averaging its signals sample-by-sample;
constructing a peak cancellation signal for each reference signal which can reduce the peak magnitude level of the reference signal below the target peak threshold;
obtaining the frequency domain representation of each reference signal and its corresponding peak cancellation signal by performing a Discrete Fourier Transform operation;
constructing a set of coefficient vectors by computing the ratio between the frequency domain representation of the reference signal and the frequency-domain representation of its corresponding cancellation signal on a sample-by-sample basis; and
collecting the constructed set of coefficient vectors to form a database.

7. The method of claim 6 wherein the construction of the peak cancellation signal for each reference signal is performed through the following steps:
processing the reference signal to produce a clipped signal by setting the magnitude of any sample exceeding the threshold to the threshold value while maintaining the phase angle of each sample;
constructing a residual signal by subtracting the clipped signal from the reference signal;
transforming the residual signal into the frequency domain by performing a Discrete Fourier Transform;
applying a projection filter to the frequency domain signal by retaining only those frequency components which belong to the set of reserved tones while zeroing other frequency components;
transforming the filtered signal into the time domain by using an Inverse Discrete Fourier Transform;
constructing a peak cancellation signal by scaling the time domain representation of the filtered signal with an appropriate scaling factor.

8. The method of claim 6, wherein the construction of the database is performed in an offline fashion or in an external piece of hardware and updated periodically in response to changes in the sets of data tones or reserved tones.

* * * * *